United States Patent
McCauley et al.

[19]

[11] Patent Number: 5,901,736
[45] Date of Patent: May 11, 1999

[54] HAND TOOL FOR INFLATING AIR BAGS FOR STABILIZING AND PROTECTING LOADS IN FREIGHT TRAILERS

[76] Inventors: Charles A. McCauley, R.D. #2, Box 169, New Bethlehem, Pa. 16242; Larry D. McCauley, P.O. Box 56, Hawthorn, Pa. 16230

[21] Appl. No.: 08/455,187

[22] Filed: May 31, 1995

[51] Int. Cl.$^6$ ............... F16L 35/00; F16L 37/28
[52] U.S. Cl. ............ 137/231; 137/322; 251/149.6; 81/426; 285/39
[58] Field of Search ................... 137/223, 322, 137/231; 251/291, 149.1, 149.6; 285/39, 346; 81/426, 484, 486

[56] References Cited

U.S. PATENT DOCUMENTS

| | | | |
|---|---|---|---|
| 1,045,495 | 11/1912 | Austin | 285/346 X |
| 1,326,858 | 12/1919 | Glasscock | 81/426 X |
| 1,435,150 | 11/1922 | Carpenter | 81/426 |
| 2,264,638 | 12/1941 | Orr | 137/223 |
| 2,530,504 | 11/1950 | Boyer | 137/223 |
| 3,506,159 | 4/1970 | Muller | 222/323 X |
| 3,768,501 | 10/1973 | Elson et al. | 251/149.1 X |
| 3,786,994 | 1/1974 | Kukes et al. | 137/223 X |
| 3,866,654 | 2/1975 | Duquesne | 137/223 X |
| 4,005,623 | 2/1977 | Faroni | 81/426 |
| 4,108,474 | 8/1978 | Sigrist | 285/39 X |
| 4,124,148 | 11/1978 | Vieler et al. | 222/321 |
| 4,167,204 | 9/1979 | Zeyra | 251/149.1 X |
| 4,169,395 | 10/1979 | Hoskinson | 81/424 |
| 4,499,796 | 2/1985 | Miller | 81/426 |
| 4,660,745 | 4/1987 | Hess, Jr. | 222/174 |
| 4,728,076 | 3/1988 | Ganshorn et al. | 251/149.6 |
| 4,982,631 | 1/1991 | Lowther | 81/426 |

FOREIGN PATENT DOCUMENTS

| | | | |
|---|---|---|---|
| 930015 | 7/1963 | United Kingdom | 137/322 |

*Primary Examiner*—John Rivell
*Attorney, Agent, or Firm*—Webb Ziesenheim Bruening Logsdon Orkin & Hanson, P.C.

[57] ABSTRACT

Valve actuating hand tools for inflating and deflating an air bag having a valve with a valve head and movable valve stem is disclosed. Each hand tool includes a first elongated member having a gripping portion at one end thereof and a valve head engaging member at an opposite end thereof. A second elongated member is pivotally coupled to the first elongated member with the second elongated member including a gripping portion at a first end thereof and a valve stem engaging member at an opposite end thereof. A spring is connected to the first and second elongated members to bias the valve head engaging member toward the valve stem engaging member. With the hand tool in an operative position, the valve head engaging member engages the valve head with the valve stem engaging member engaging the valve stem to position the valve in an open position.

10 Claims, 5 Drawing Sheets

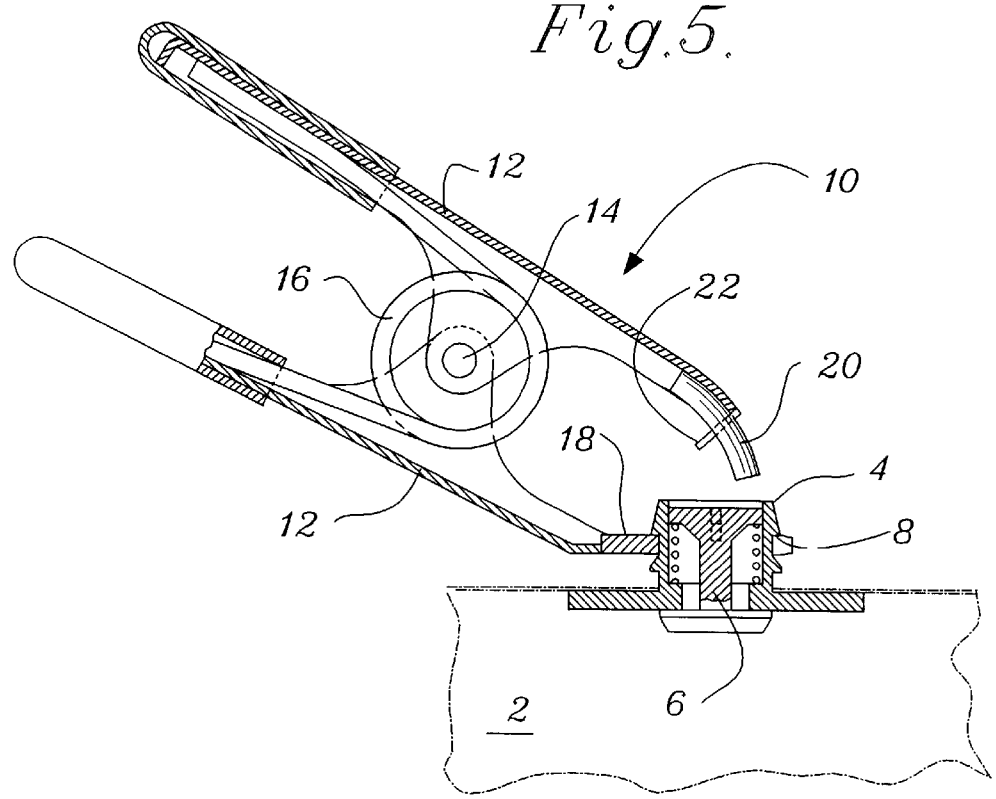
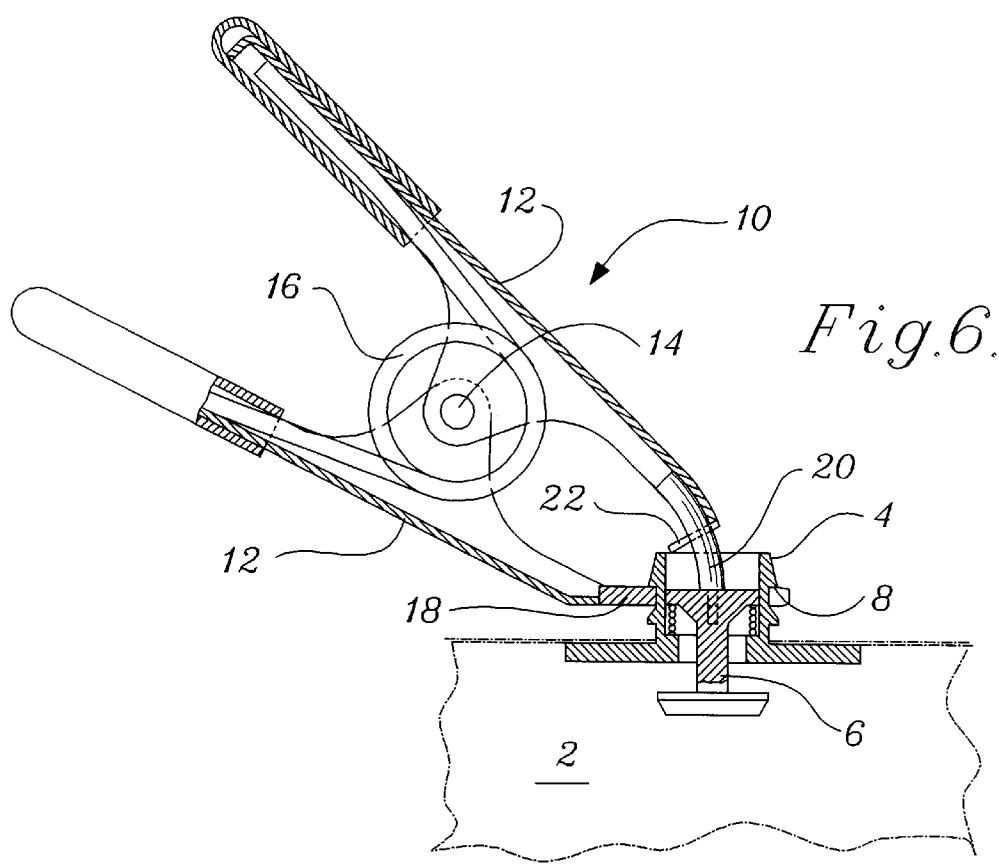

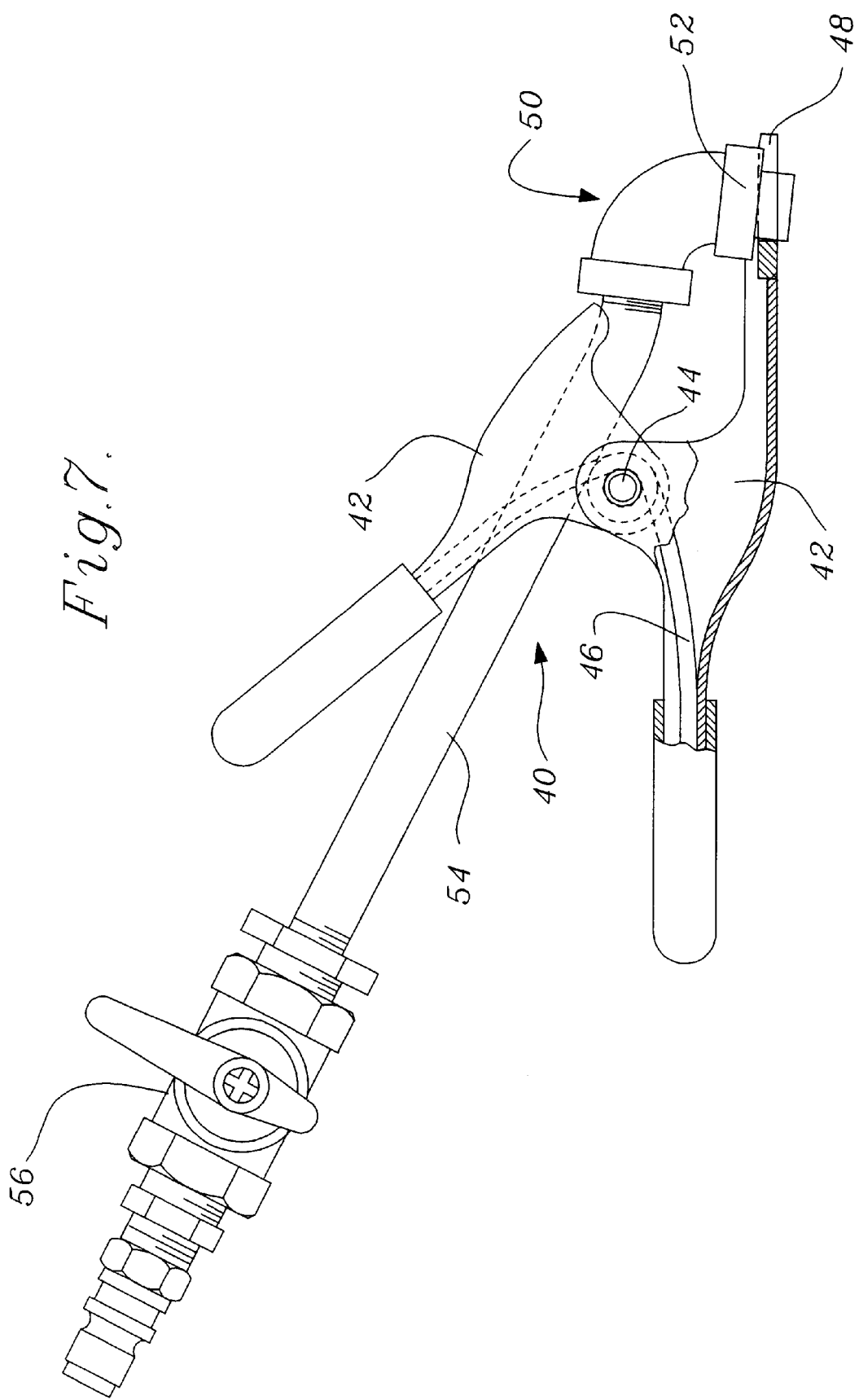

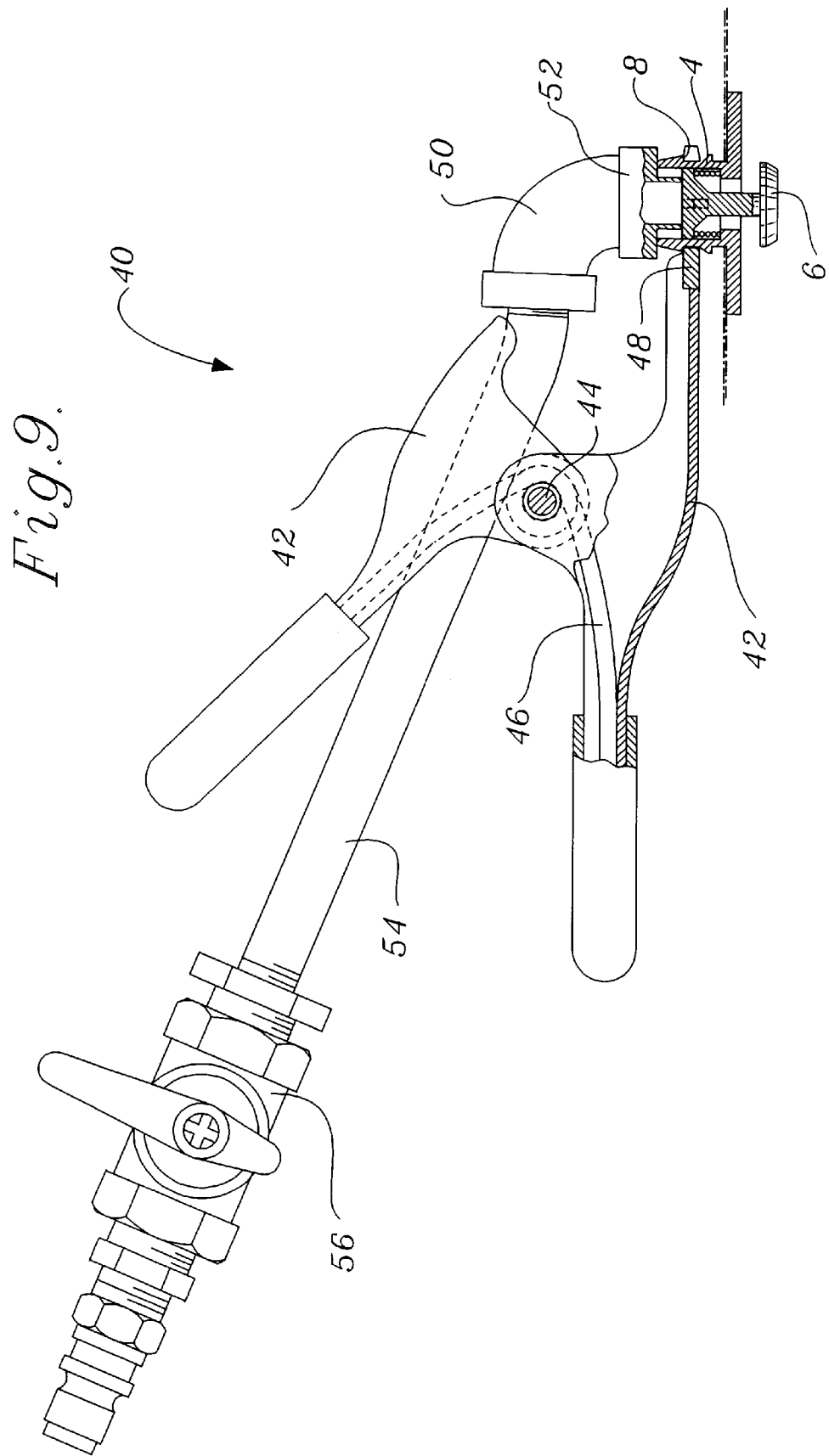

5,901,736

HAND TOOL FOR INFLATING AIR BAGS FOR STABILIZING AND PROTECTING LOADS IN FREIGHT TRAILERS

BACKGROUND OF THE INVENTION

1. Field of the Invention

The present invention relates to valve actuating hand tools, more specifically, to hand tools for deflating and inflating air bags.

2. Background Information

In freight trailers, air bags are often utilized for stabilizing and protecting fragile loads, such as glass and the like. When used, at least one air bag is positioned at the rear of the trailer and must be removed prior to unloading the trailer. The customary method for removing an air bag is to deflate the air bag by slashing it and disposing of the air bag. This has been found to be particularly costly due to both the replacement cost of the air bag and the cost of disposing of the slashed air bag.

A typical air bag, when deflated, is about 4 feet by 8 feet and a standard opening in a freight trailer is about 100inches high. Each air bag includes a valve at one corner of the bag having a valve head and a movable self-sealing valve stem. A typical air bag is supplied from Shipper Paper Products, an ITW Company, of 1203 North Main Street, P.O. Box 69, Mount Pleasant, Tenn. 38374.

An object of the present invention is to develop hand tools for deflating and inflating air bags used for stabilizing and protecting loads in freight trailers. Such hand tools will allow for the reuse of air bags minimizing costs.

The prior art has developed a wide variety of specialized tools for actuating valves. For example, U.S. Pat. Nos. 4,660,745; 4,124,148; and 3,506,159 all disclose valve actuators adapted for actuating a nozzle on an aerosol can or the like. U.S. Pat. Nos. 4,499,796 to Miller and 1,326,858 to Glasscock also disclose tools for specialized valve workpieces. Specifically, the Glasscock patent discloses a tool for removing valves from combustion engines and the Miller patent discloses a tool for opening a check valve positioned at the end of a hydraulic hose.

The highly specialized tools of the prior art are not particularly adapted for use with a valve on an air bag. The object of the present invention is to overcome the drawbacks of the aforementioned prior art. It is an object of the present invention to provide hand tools for quickly and easily deflating and inflating air bags for stabilizing and protecting loads in freight trailers. It is a further object of the present invention to provide hand tools which are easily positioned in an operative position on the valve of an air bag and maintain the operative position of the hand tool without user assistance.

SUMMARY OF THE INVENTION

The object of the present invention is achieved by providing a valve actuating hand tool for actuating an air bag valve having a valve head and a movable valve stem. The hand tool of the present invention includes a first elongated member having a gripping portion at one end thereof and a valve head engaging member at an opposite end thereof. A second elongated member is pivotally coupled to the first elongated member with the second elongated member having a gripping portion at one end thereof and a valve stem engaging member at an opposite end thereof. A spring may be connected to the first and second elongated members to bias the valve head engaging member toward the valve stem engaging member wherein when the valve actuating hand tool is in an operative position the valve head engaging member engages the valve head and the valve stem engaging member engages the valve stem to position the valve in an open position. With the hand tool in the operative position the spring, the valve head engaging member, and the valve stem engaging member cooperate to maintain the hand tool in the operative position without user assistance.

The valve head engaging member may include a central recess therein which is adapted to receive the valve head therein with the hand tool in the operative position. The valve head engaging member is adapted to abut an upper ridge of the valve head with the hand tool in the operative position.

A hand tool for deflating an air bag according to the present invention positions the valve head engaging member extending away from a longitudinal line of the gripping portion of the first elongated member whereby the valve head engaging member forms an angle with respect to the gripping portion. In the deflating tool, the valve stem engaging member includes a post extending toward the valve head engaging member wherein the post is adapted to extend through a central recess of the valve head engaging member when the hand tool is in the operative position, thereby opening the valve and allowing the air bag to deflate. The deflating hand tool may include a stop attached to the post adapted to abut against the valve head engaging member when the deflating hand tool is in an inoperative position.

A hand tool for inflating an air bag according to the present invention provides the valve stem engaging member as a hollow tube with a valve seat surrounding the hollow tube. The valve seat is adapted to sealingly abut against an upper surface of the valve head when the hand tool is in the operative position. The inflating hand tool further includes a valve member in fluid communication with the hollow tube. The valve member is adapted to be coupled to a source of pressurized medium whereby medium can be supplied through the open valve with the hand tool in the operative position by activation of the valve member.

These and other objects of the present invention will be clarified in the description of the preferred embodiments taken together with the attached figures.

BRIEF DESCRIPTION OF THE DRAWINGS

FIG. 5 is a sectional view of the deflating hand tool shown in FIG. 3 illustrating the deflating hand tool being positioned in an operative position on an air bag valve;

FIG. 6 is a sectional view of the deflating hand tool shown in FIGS. 3 and 5 with the deflating hand tool in an operative position on the air bag valve;

FIG. 7 is a side view, partially in section, of an inflating hand tool according to the present invention with the inflating hand tool in an inoperative position;

FIG. 9 is a sectional view of the inflating hand tool shown in FIGS. 7–8 with the inflating hand tool in an operative position on the air bag valve.

DESCRIPTION OF THE PREFERRED EMBODIMENTS

Figure 1:
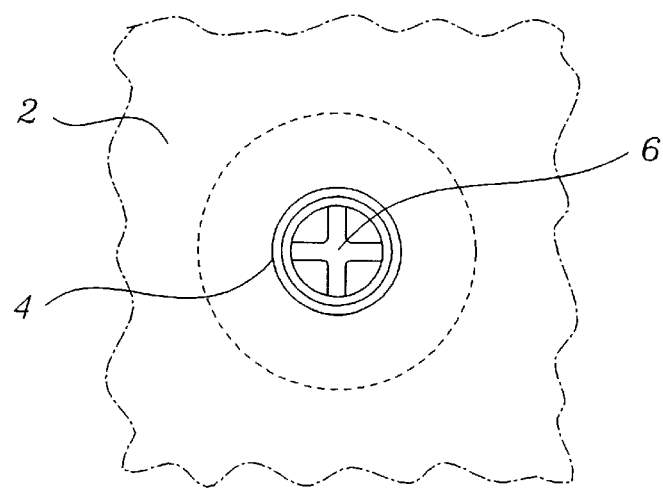
FIG. 1 is a top view of an air bag valve.
Figure 2:
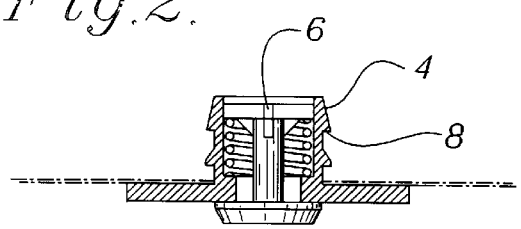
FIG. 2 is a sectional view of the valve shown in FIG. 1.

As shown in FIGS. 1–2, air bag 2 includes a self-sealing valve assembly in the corner thereof having a valve head 4 and a spring biased movable self-sealing valve seat 6. The valve head 4 additionally includes an outwardly extending upper ridge 8 thereon.

Figure 4:
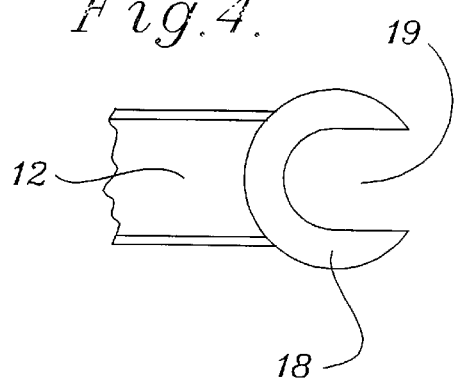
FIG. 4 is a top view of a valve head engaging member of the deflating hand tool shown in FIG. 3.
Figure 3:
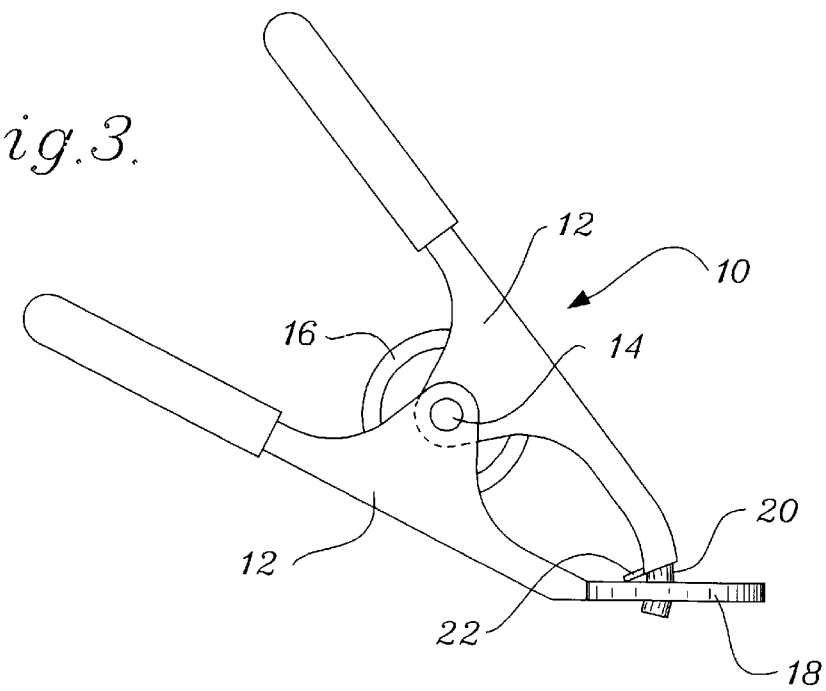
FIG. 3 is a side view of an air bag valve deflating hand tool according to the present invention with the deflating hand tool in an inoperative position.

FIGS. 3–6 illustrate a deflating hand tool 10 according to the present invention. The deflating hand tool 10 includes spaced upper and lower elongated handle members 12 pivoted together at pivot 14. The forward ends of the handles 12 are biased toward each other by biasing spring 16 which is connected to each handle 12. Each handle 12 includes a gripping portion at a rearward end thereof, which may be provided with plastic or similar gripping sleeves to assist the user. The lower handle 12 includes a valve head engaging member 18 at one end thereof opposite the gripping portion. The valve head engaging member 18 extends away from a longitudinal line of the gripping portion of the lower handle 12 whereby the valve head engaging member 18 forms an angle with respect to the first gripping portion as shown in FIG. 3. This angle allows better access of the deflating hand tool 10 onto the valve head 4 of the inflated air bag. The valve head engaging member 18 includes a central recess 19 therein as best shown in FIG. 4. The recess 19 is adapted to receive the valve head 4 therein with the deflating hand tool 10 in an operative position. The valve head engaging member 18 will securingly abut against the upper ridge 8 of the valve head 4 when the deflating hand tool 10 is in the operative position shown in FIG. 6.

The upper handle 12 includes a valve stem engaging member 20 at a forward end thereof extending at an angle away from the upper handle 12 toward the valve head engaging member 18. The valve stem engaging member 20 is formed as a curved post. The post is adapted to extend through the central recess 19 to depress the valve stem 6 when the deflating hand tool 10 is in the operative position shown in FIG. 6. A stop 22 is attached to the post and is adapted to abut against the valve head engaging member 18 when the deflating hand tool is in an inoperative position shown in FIG. 3. The stop 22 minimizes the pivoting of the handles 12 in the inoperative position.

In operation, the deflating hand tool 10 is positioned on the valve of the air bag 2 as shown in FIG. 5. The gripping portions are pivoted toward each other to move the valve stem engaging member 20 away from the valve head engaging member 18 and allow the valve head 4 to be received in recess 19 of the valve head engaging member 18 as shown in FIG. 5. The handle gripping portions are released thereby positioning the deflating hand tool 10 into the operative position as shown in FIG. 6. In the operative position, the force of spring 16 will bias the valve stem engaging member 20 toward the valve stem 6 depressing the valve stem 6 to open the valve. In the operative position, the spring 16, the valve head engaging member 18, which abuts against the ridge 8 of the valve head 4, and the valve stem engaging member 20, which is abutted against the depressed valve stem 6, will cooperate to maintain the deflating hand tool 10 in the operative position without user assistance allowing the air bag 2 to automatically deflate. After the air bag 2 has been deflated, the deflating hand tool 10 can be removed in the manner illustrated in FIG. 5.

Figure 8:
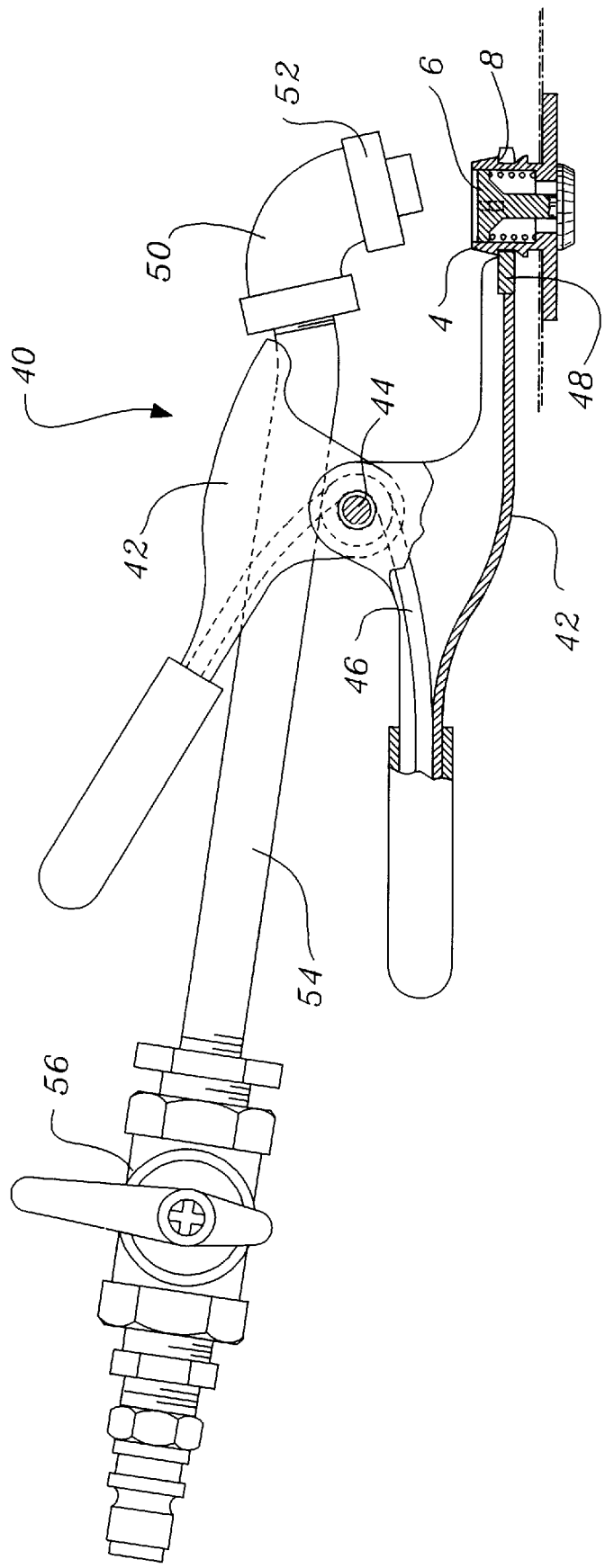
FIG. 8 is a sectional side view of the inflating hand tool shown in FIG. 7 illustrating the inflating hand tool being positioned on an air bag valve.

An inflating hand tool 40 according to the present invention is shown in FIGS. 7–9. The inflating hand tool 40 includes upper and lower elongated handle members 42, pivot 44, spring 46 and valve head engaging member 48 substantially the same as shown in deflating hand tool 10 discussed above. The valve head engaging member 48 is generally aligned with lower handle 42 rather than being angled with respect thereto as in the deflating hand tool 10 discussed above. The inflating of the air bag 2 does have the same space limitations since the air bag is not inflated. A valve stem engaging member 50 of the inflating hand tool 40 includes a hollow tube adapted to depress the valve stem 6 with a valve seat 52 surrounding the hollow tube. The valve seat 52 is adapted to sealingly seat against an upper surface of the valve head 4 when the inflating hand tool 40 is in the operative position shown in FIG. 9. The hollow valve stem engaging member 50 is connected through supply pipe 54 to an actuating valve 56 which is adapted to be coupled to a supply of pressurized medium (not shown), such as compressed air.

In operation, the gripping portions of the handles 42 are depressed to allow the inflating hand tool 40 to be positioned on the air bag valve as shown in FIG. 8. The handles 42 are released to position the inflating hand tool 40 in the operative position shown in FIG. 9 opening the valve. With the inflating hand tool 40 in the operative position, the hollow tube of the valve stem engaging member 50 depresses the movable valve stem 6 to the open position as shown in FIG. 9 and the stepped valve seat 52 seals against the upper surface of the valve body. The valve head engaging member 48 abuts against the ridge 8 of the valve head 4. The spring 46 biases the valve head engaging member 48 toward the valve stem engaging member 50 and cooperates with the valve stem engaging member 50 and the valve head engaging member 48 to maintain the inflating hand tool 40 in the operative position shown in FIG. 9 without user assistance. In the operative position shown in FIG. 9 the air bag can be inflated by opening the actuating valve 56 to inflate the air bag by coupling the air bag to the source of pressurized medium, such as pressurized air. Once the air bag 2 is inflated, which takes approximately 60 seconds, the actuating valve 56 can be closed and the inflating hand tool 40 removed from the air bag valve shown in FIG. 8.

It is additionally contemplated that the actuating valve 56 could be provided as a three position valve: a first position sealing the valve stem engaging member 50, a second position opening fluid communication between the valve stem engaging member 50 and a source of pressurized medium and a third position opening or venting the valve stem engaging member 50 with atmosphere. This three-position arrangement will allow for the inflating hand tool 40 to also be utilized to deflate the air bag 2 by venting the air bag 2 to atmosphere.

It would be obvious to those of ordinary skill in the art that various modifications may be made to the present invention without departing from the spirit and scope thereof. Consequently, the scope of the present invention is intended to be defined by the attached claims.

We claim:

1. A valve actuating hand tool for actuating a valve having a valve head and movable valve stem, said hand tool comprising:
   a first elongated member having a gripping portion at one end thereof and a valve head engaging member at an opposite end thereof;
   a second elongated member pivotally coupled to said first elongated member, said second elongated member having a gripping portion at one end thereof and a valve stem engaging member at an opposite end thereof wherein said valve stem engaging member includes a hollow tube engagable with the valve stem; and a spring connected to said first and second elongated members biasing said valve head engaging member toward said valve stem engaging member, wherein when said hand tool is in an operative position said valve head engaging member engages the valve head and said valve stem engaging member engages said valve stem to position the valve in an open position.

2. The hand tool of claim 1 wherein when said hand tool is in said operative position said spring, said valve head engaging member, and said valve stem engaging member cooperate to maintain said hand tool in said operative position without user assistance.

3. The hand tool of claim 1 wherein said valve head engaging member includes a central recess therein which is adapted to receive the valve head when said hand tool is in said operative position.

4. The hand tool of claim 3 wherein said valve head engaging member is adapted to abut against an upper ridge of the valve head when said hand tool is in said operative position.

5. The hand tool of claim 1 wherein said valve head engaging member extends away from a longitudinal line of said gripping portion of said first elongated member whereby said valve head engaging member forms an angle with respect to said gripping portion.

6. The hand tool of claim 1 wherein said valve stem engaging member includes a valve seat surrounding said hollow tube, said valve seat adapted to sealingly abut against an upper surface of the valve head when said hand tool is in said operative position.

7. The hand tool of claim 6 including a valve member in fluid communication with said hollow tube, said valve member adapted to be coupled to a source of pressurized medium whereby medium can be supplied through the valve with said hand tool in said operative position by activation of said valve member.

8. A hand tool for inflating an air bag having a valve with a valve head and movable valve stem, said hand tool comprising:
   a first elongated member having a gripping handle portion at one end thereof and a valve head engaging member at an opposite end thereof;
   a second elongated member pivotally coupled to said first elongated member, said second elongated member having a gripping handle portion at one end thereof and a valve stem engaging member at an opposite end thereof, wherein said valve stem engaging member includes a hollow tube engagable with the valve stem; and
   a valve member in fluid communication with said valve stem engaging member and adapted to be coupled to a source of pressurized medium wherein when said inflating hand tool is in an operative position said valve head engaging member engages the valve head and said valve stem engaging member engages the valve stem to position the valve in a open position whereby the air bag is adapted to be inflated with the medium by operation of said valve member.

9. The hand tool of claim 8 further including a spring connected to said first and second elongated members biasing said valve head engaging member toward said valve stem engaging member wherein with said hand tool in said operative position said spring, said valve head engaging member, and said valve stem engaging member cooperate to maintain said hand tool in said operative position without user assistance.

10. The hand tool of claim 8 wherein said valve stem engaging member includes a valve seat surrounding said hollow tube, said valve seat adapted to sealingly abut against an upper surface of the valve head when said hand tool is in said operative position.

* * * * *